US012145157B1

(12) United States Patent
Jiang et al.

(10) Patent No.: US 12,145,157 B1
(45) Date of Patent: Nov. 19, 2024

(54) SPIRAL SORTING DEVICE FOR KITCHEN WASTE BASED ON HARDNESS SCREENING

(71) Applicant: SHANGHAI YIMAI INDUSTRIAL CO., LTD., Shanghai (CN)

(72) Inventors: Jufeng Jiang, Shanghai (CN); Miao Cao, Shanghai (CN); Guoyong Gong, Shanghai (CN); Qinglin Wang, Shanghai (CN); Zhiming Chu, Shanghai (CN); Shiping Yuan, Shanghai (CN); Xuezhi Yu, Shanghai (CN); Wei Wang, Shanghai (CN)

(73) Assignee: SHANGHAI YIMAI INDUSTRIAL CO., LTD., Shanghai (CN)

( * ) Notice: Subject to any disclaimer, the term of this patent is extended or adjusted under 35 U.S.C. 154(b) by 0 days.

(21) Appl. No.: 18/683,701

(22) PCT Filed: Nov. 29, 2023

(86) PCT No.: PCT/CN2023/134985
§ 371 (c)(1),
(2) Date: Feb. 14, 2024

(30) Foreign Application Priority Data

Nov. 8, 2023 (CN) ......................... 202311482429.4

(51) Int. Cl.
*B02C 18/00* (2006.01)
*B02C 18/28* (2006.01)
*B02C 23/16* (2006.01)

(52) U.S. Cl.
CPC .......... *B02C 18/0092* (2013.01); *B02C 18/28* (2013.01); *B02C 23/16* (2013.01); *B02C 2023/165* (2013.01)

(58) Field of Classification Search
CPC . B02C 23/36; B02C 18/0092; B02C 18/0084; E03C 1/2665; E03C 1/266
See application file for complete search history.

(56) References Cited

U.S. PATENT DOCUMENTS

2005/0183588 A1 8/2005 Riesenberg et al.

FOREIGN PATENT DOCUMENTS

CN 209174570 U 7/2019
CN 111790189 A 10/2020
(Continued)

OTHER PUBLICATIONS

Translation of CN-115815297 (Year: 2023).*
(Continued)

*Primary Examiner* — Bobby Yeonjin Kim
(74) *Attorney, Agent, or Firm* — Zhu Lehnhoff LLP

(57) ABSTRACT

The present invention discloses a spiral sorting device for kitchen waste based on hardness screening, and relates to the technical field of kitchen waste processing, including a housing, wherein a feed plate, a discharge plate, a gear box, and a drive motor are mounted on the outer side of the housing, two crushing rollers are mounted inside the housing, the two crushing rollers are connected to the drive motor via the gear box, a gear set is provided inside the gear box, several push plates and several sawtooth rings are mounted inside the housing, a slicing knife is mounted between the sawtooth rings, the sawtooth ring is perpendicular to the slicing knife, and linkage rings are mounted at the front end and rear end of the slicing knife. The present invention is provided with two types of crushing mechanisms. The two types of crushing mechanisms perform targeted crushing according to the hardness of the kitchen waste. In order to enable the crushed kitchen waste to reduce the time required for drying and dewatering, an extruding function is added before the crushed kitchen waste leaves the housing so as to perform preliminary dewatering on the crushed kitchen waste.

8 Claims, 6 Drawing Sheets

(56) References Cited

FOREIGN PATENT DOCUMENTS

| | | | | |
|---|---|---|---|---|
| CN | 214813532 | U | | 11/2021 |
| CN | 114130788 | A | * | 3/2022 |
| CN | 115041278 | A | * | 9/2022 |
| CN | 217755136 | U | | 11/2022 |
| CN | 115815297 | A | * | 3/2023 |
| JP | 2012120998 | A | | 6/2012 |

OTHER PUBLICATIONS

Translation of CN-115041278 (Year: 2022).*
Translation of CN-114130788 (Year: 2022).*
International Search Report, issued in PCT/CN2023/134985, dated Jan. 9, 2024.
Written Opinion, issued in PCT/CN2023/134985, dated Jan. 9, 2024.

* cited by examiner

SPIRAL SORTING DEVICE FOR KITCHEN WASTE BASED ON HARDNESS SCREENING

TECHNICAL FIELD

The present invention relates to the technical field of kitchen waste processing, in particular to a spiral sorting device for kitchen waste based on hardness screening.

BACKGROUND

With the continuous development of China's social economy and people's life, as well as the continuous advancement of domestic household garbage classification across the country, the requirements for rapid treatment technology of household kitchen garbage are gradually increasing, and the treatment of household garbage is becoming more and more prominent. The treatment of household garbage in China is still a problem not well solved. The water content of kitchen garbage is high, and the rate of decay is fast. It is very easy to produce off-flavor, and it is easy to cause damage to the surrounding environment in the storage and transportation environment. Moreover, kitchen garbage is mainly organic matter, which makes it easy to grow germs, becomes a medium for spreading diseases, and brings hazards to human health.

Kitchen castoff is often mixed with plastic bottles, big bones, chopsticks, and some elongated or round substances, which are often not well crushed and cause the failure of a shredder. Or large pieces of materials and long fiber substances are included in the materials, affecting the drying effect of the materials. In order to solve this problem, in traditional practices, manual sorting is commonly used. Relying on manual sorting in advance, the traditional practice wastes a lot of manpower and resources. Besides, the effectiveness of screening and picking varies from person to person, which cannot provide guarantees.

SUMMARY OF THE INVENTION

The object of the present invention is to provide a spiral sorting device for kitchen waste based on hardness screening to solve the problem proposed in the background art.

In order to solve the above technical problem, the present invention provides the following technical solutions: a spiral sorting device for kitchen waste based on hardness screening, including a housing, wherein a feed plate, a discharge plate, a gear box, and a drive motor are mounted on the outer side of the housing, two crushing rollers are mounted inside the housing, the two crushing rollers are connected to the drive motor via the gear box, and a gear set is provided inside the gear box;

several push plates and several sawtooth rings are mounted inside the housing, a slicing knife is mounted between the sawtooth rings, the sawtooth ring is perpendicular to the slicing knife, a linkage ring is mounted on a front end and rear end of the slicing knife, a fixed plate is mounted on an outer side of the sawtooth ring, a metal mesh is mounted on a lower end of the housing, and a water outlet is mounted on a lower end of the metal mesh; and a drive motor at the front end of the housing is started; the drive motor drives the crushing roller to rotate via a gear set inside the gear box, and the two crushing rollers rotate towards each other; a drive motor is provided at the rear end of the housing; the drive motor drives the push plate to work via the gear, so that the push plate performs circular movement inside the housing; kitchen waste required to be processed enters the interior of the housing via the feed plate; the push plate moves the kitchen waste above the interior of the sawtooth ring, so that the kitchen waste rises along the inner wall of the sawtooth ring; the push plate is arranged between the linkage rings in an inclined manner; when the push plate rises to a certain height, the height of one side of the push plate close to the crushing roller is lower than the height of one side of the push plate close to the sawtooth ring, the kitchen waste on the push plate will slide along the outer wall of the push plate into the recess between the crushing rollers, the crushing roller breaks the kitchen waste, and finally the broken kitchen waste falls to the lower part of the interior of the housing through the gap of the sawtooth ring.

Further, the crushing roller comprises an action shaft and a crushing tooth, wherein the action shaft is composed of a cylindrical shaft and a circular truncated cone shaft, one side with a small outer diameter of the circular truncated cone shaft is connected to the housing on one side where the feed plate is mounted, one side with a large outer diameter of the circular truncated cone shaft is connected to the cylindrical shaft, and the crushing tooth is cylindrical in a rotating state; and the special-shaped structure of the crushing roller is such arranged that the crushing effect of one side of the crushing roller close to the feed plate is lower than the crushing effect of one side of the crushing roller away from the feed plate; and since the gap between the circular truncated cone shafts is greater than the gap between the cylindrical shafts, the circular truncated cone shaft cooperates with the outer-side crushing tooth to preliminarily crush the kitchen waste, the crushing tooth on the outer side of the circular truncated cone shaft crushes the high-hardness waste inside the kitchen waste, and the crushing tooth on the outer side of the cylindrical shaft further crushes the high-hardness waste inside the kitchen waste, so that the crushed waste can pass through the gap of the sawtooth ring.

Further, the push plate is connected to the linkage ring via a spring shaft, and the push plate is composed of a pressure plate and a comb tooth, wherein several steel wires are mounted inside the pressure plate, the steel wire is perpendicular to the sawtooth ring, and an outer wall of the comb tooth is fitted with the sawtooth ring; the push plate is arranged between the linkage rings in an inclined manner; at the same time, the radius of rotation of the push plate on one side of the spring shaft close to the crushing roller is equal to the linear distance between the crushing roller and the spring shaft; the push plate is arranged in an inclined manner relative to the linkage ring; an acute-angle accommodating groove is formed between the push plate and the sawtooth ring; during the operation of the push plate, the waste inside the acute-angle accommodating groove slides along the inner wall of the sawtooth ring; the torsional force of the spring shaft is greater than the resistance force of the waste moving on the sawtooth ring; therefore, the spring shaft provides a pressure for the waste toward the sawtooth ring via the push plate in a reverse direction; and during the movement of the waste relative to the sawtooth ring pushed by the push plate, the waste is preliminarily cut, and the elongated waste is segmented; and with the cooperation of the push plate, the high-hardness waste that cannot be cut by the sawtooth ring is then guided along the inclined surface of the push plate into the groove of the crushing roller, so that the crushing roller can crush the high-hardness waste; and the structural arrangement of the pressure plate is as follows: by providing a fine steel wire strip on the push plate, the adhesion area of the waste on the push plate is greatly reduced without reducing the pressing effect, so as to avoid the phenomenon that the waste cannot be separated from the push plate under the action of gravity during the operation of the push plate; the steel wire is a metal wire with a small diameter, the pressure formed on the spring shaft directly acts on the waste through the steel wire, the spring shaft cooperates with the steel wire to form a high intensity of pressure on the surface of the waste, and part of the waste with a low hardness is preliminarily crushed, so as to increase the proportion of the waste with a high hardness inside the accommodating groove; and the steel wire is perpendicular to the sawtooth ring, and the steel wire and the sawtooth ring cooperate with each other to improve the cutting effect on the waste.

Further, one side of the sawtooth ring close to the comb tooth is provided with a sawtooth, an outer surface structure of the sawtooth conforms to an outer surface structure of the comb tooth, and a length value of the comb tooth is greater than a width of the sawtooth ring; and the sawtooth is so arranged so as to further improve the cutting effect on the waste; during the sliding of the push plate along the outer wall of the sawtooth ring, the recesses between the comb teeth clean the outer wall of the sawtooth ring, so as to avoid the scenario that the waste adheres to the surface of the sawtooth ring for a long time, which would otherwise result in the occurrence of corrosion on the outer wall of the sawtooth ring; and at the same time, the length value of the comb tooth is greater than the width of the sawtooth ring, so as to penetrate through the gap between the sawtooth ring, thereby enabling the waste to avoid being caught in the gap between the sawtooth rings which would otherwise affects the effect of the sawtooth ring separating small-particle waste.

Further, inner tooth rings are mounted on a front end and rear end of the fixed plate, tooth grooves are provided on both an inner wall of the inner tooth ring and an outer side of the linkage ring, the inner tooth ring and the linkage ring are connected via a gear, and a drive motor is mounted on one side of the gear; and drive motors are mounted on two sides of the housing; the drive motor on the front side of the housing is used for driving the crushing roller; the crushing rollers on the rear side of the housing rotate towards each other between the inner tooth ring and the linkage ring via a gear; the inner tooth ring and the linkage ring are both rotatably connected to the housing; the inner tooth ring is connected to the sawtooth ring; the linkage ring is connected to the push plate, and then the sawtooth ring and the push plate rotate relative to each other, so that the push plate further increases the length of action of the sawtooth ring on the pushed waste within one cycle of pushing the waste; the inner tooth ring and the linkage ring penetrate through the rear side of the housing, an annular shell exists between the inner tooth ring and the linkage ring, the annular shell is connected to the housing via a bracket, the drive motor is mounted on the annular shell, and the inner tooth ring and the linkage ring protruding on the outer side of the housing are driven via a gear.

Further, a conveying plate is mounted between the linkage rings, the conveying plate is in a helicoid shape, several notches are provided between the conveying plates, the push plate is provided in a middle of the notch, and an outer wall of the conveying plate is fitted with the sawtooth ring; the conveying plate is mounted on the outer side of the linkage ring, and under the drive of the drive motor, the conveying plate rotates inside the sawtooth ring under the transmission of the linkage ring, the waste enters a cylindrical cavity in the sawtooth ring inside the housing through the feed plate, and the conveying plate in a working state transfers the waste entering the cavity to the depth of the housing, so as to ensure that the waste is uniformly spread on the sawtooth ring; and at the same time, the waste inside the sawtooth ring is disturbed, so that the sawtooth ring screening the small-particle waste is accelerated, so as to reduce the processing strength of the sawtooth ring; and several notches are provided on the conveying plate, so that the push plate penetrates through the conveying plate, and the space limited by the notches is the movement space of the push plate, so as to limit the deflection angle of the push plate.

Further, a torsion spring is mounted on one side of the slicing knife, one side of the torsion spring is connected to the inner tooth ring, a sliding groove is provided on the inner tooth ring, and the slicing knife is slidably connected to the inner tooth ring via the sliding groove; when the waste moves inside the acute-angle accommodating groove, part of the waste is under the pressure formed by the spring shaft and the push plate, the waste extends into the gap of the sawtooth ring, and the arrangement of the slicing knife cuts the waste extending into the gap of the sawtooth ring; and since the slicing knife and the sawtooth ring are arranged perpendicularly to each other, the crushing effect of the waste is further improved; and a certain amount of high-hardness waste exists in the waste, and the slicing knife cannot form a cutting effect on the high-hardness waste; when the high-hardness waste comes into contact with the slicing knife, the torsion spring and the inner ring magnetic ring are connected via a second spring; the high-hardness waste pushes the slicing knife to deflect with the second spring shaft as the center of the circle; at the same time, the included angle formed between the action rods at two ends of the torsion spring decreases, and the distance between the deflected slicing knife and the sawtooth increases until the high-hardness waste completely passes over the slicing knife; by the arrangement of the second spring shaft and the torsion spring, protection is provided for the slicing knife, the sliding groove provides a limiting effect for the slicing knife, the slicing knife is arranged obliquely in a normal state, and the included angle formed between the movement direction of the waste and the slicing knife is an acute angle; and when the torsion spring is twisted to the maximum limit, the included angle formed between the slicing knife and the movement direction of the high-hardness waste is an obtuse angle.

Further, the fixed plate has an arc shape, two ends of the fixed plate have a semi-circular shape, the slicing knife is stored in the sawtooth ring, and a gap between the fixed plate and the housing is smaller than a gap between the sawtooth ring and the housing; two ends of the fixed plate are connected to the inner tooth ring, the drive motor works to drive the inner tooth ring to rotate, and at the same time, the fixed plate rotates in the housing; since the gap between the fixed plate and the housing is smaller than the gap between the sawtooth ring and the housing, and at the same time, the fixed plate is arranged in an arc-shaped plate shape, when the fixed plate passes through the region where the metal mesh is located, the fixed plate presses the waste crushed at the lower part of the interior of the housing, the liquid in the waste is extruded and leaves through the metal mesh, then the fixed plate pushes the extruded waste into the region where the discharge plate is located, and the waste finally leaves the housing through the discharge plate; and since the sawtooth rings are connected via the fixed plate, when the comb tooth slide on the sawtooth rings to the region where the fixed plate is located, due to the obstruction of the fixed plate, the push plate is forced to deflect with the spring shaft as the center of the circle until the push plate passes over the region where the fixed plate is located, the push plate is quickly reset under the action of the spring shaft until the push plate meets the sawtooth ring, and the speed change effect of the push plate during the reset causes the waste adhered on the surface of the push plate to separate under the action of inertia.

Compared with the prior art, the beneficial effects of the present invention are as follows.

1. According to the spiral sorting device for kitchen waste based on hardness screening, by providing a crushing roller, the special-shaped design of the action shaft inside the crushing roller performs a preliminary treatment on the high-hardness waste near the feed plate, so as to avoid a large working strength of the crushing roller near the feed plate, resulting in a large difference in working strengths between the front end and rear end of the crushing roller; and the area where the cylindrical roller on the action shaft is located performs a final treatment on the high-hardness waste so as to ensure that the crushed waste can leave through the gap of the sawtooth ring.

2. According to the spiral sorting device for kitchen waste based on hardness screening, by providing a push plate, the structure of the push plate itself is such provided that the push plate reduces the adhesion strength between the kitchen waste and the push plate during pushing the kitchen waste; at the same time, the gap of the sawtooth ring is cleaned by the comb tooth, and the push plate cooperates with the sawtooth ring to treat the waste with low hardness in the kitchen waste so as to increase the proportion of the waste with high hardness in the kitchen waste; and finally, in cooperation with the crushing roller, the high-hardness waste is centrally treated.

3. According to the spiral sorting device for kitchen waste based on hardness screening, by providing a sawtooth ring, the sawtooth on the inner wall of the sawtooth ring is arranged to accelerate the separation of low hardness waste and crush rapidly, so as to avoid the overstock of wastes inside the housing due to continuous addition, and ensure that the volume of the waste required to be processed inside the housing is within a dynamic range; the sawtooth ring cooperates with the fixed plate and the inner tooth ring to achieve the rotation of the sawtooth ring inside the housing, thereby achieving the scenario that each region on the sawtooth ring can be in contact with the waste, so as to ensure that each region on the sawtooth ring has the same working strength in the processing cycle, and at the same time, the waste leaving the housing is extruded, so as to achieve a preliminary dewatering effect.

BRIEF DESCRIPTION OF THE DRAWINGS

The accompanying drawings are used to provide a further understanding of the present invention and constitute a part of the description. The accompanying drawings are used together with embodiments of the present invention to explain the present invention and do not constitute a limitation of the present invention. In the drawings.

Figure 1:
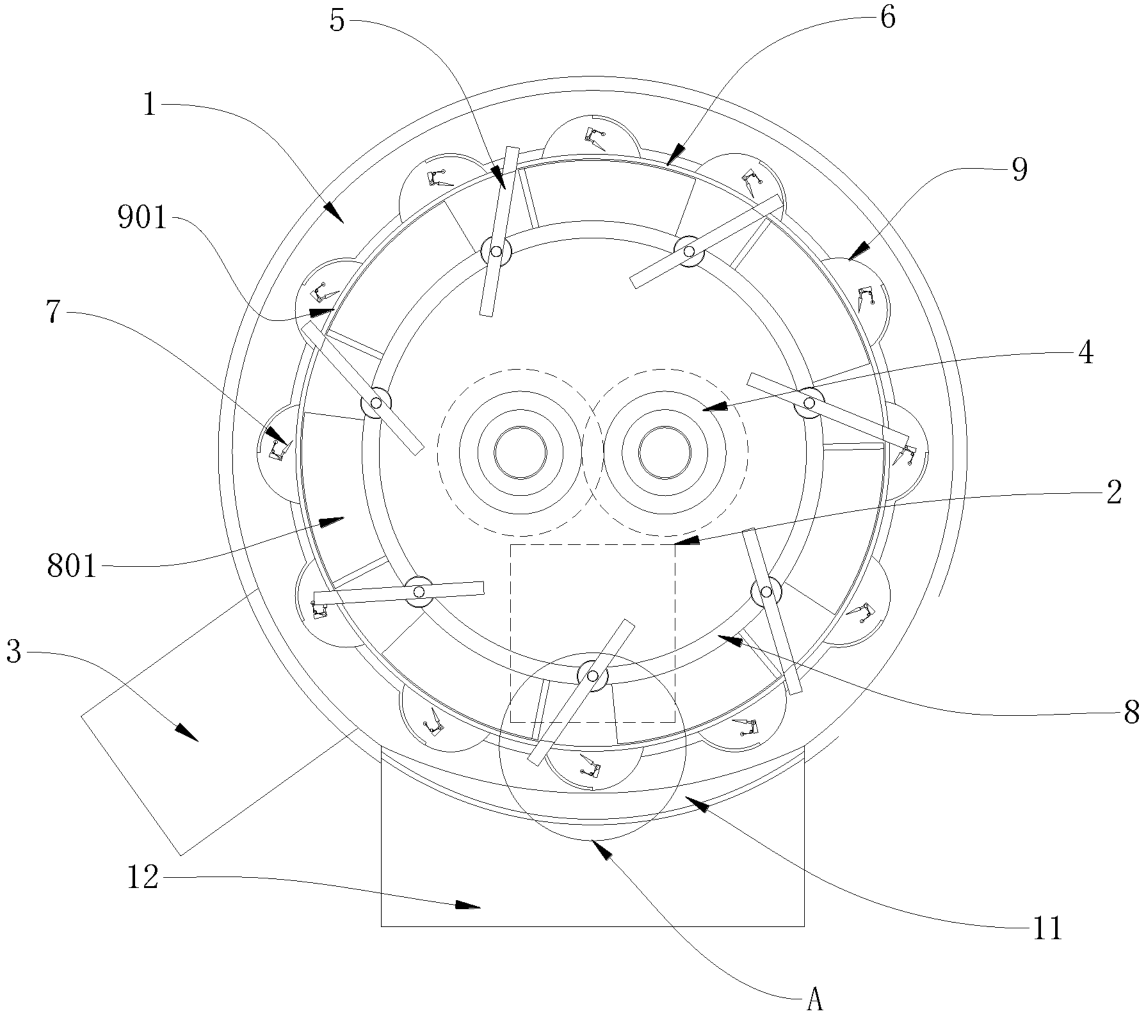
FIG. 1 is a schematic diagram of the main view of a full section structure of the present invention.

In the drawings: 1, housing; 2, feed plate; 3, discharge plate; 4, crushing roller; 401, action shaft; 402, crushing tooth; 5, push plate; 501, pressure plate; 502, comb tooth; 6, sawtooth ring; 7, slicing knife; 701, torsion spring; 8, linkage ring; 801, conveying plate; 9, fixed plate; 901, inner tooth ring; 11, metal mesh; and 12, water outlet.

DETAILED DESCRIPTION OF THE PREFERRED EMBODIMENTS

The technical solutions in the embodiments of the present invention will be clearly and completely described below in conjunction with the accompanying drawings in the embodiments of the present invention. Obviously, the described embodiments are only a part of the embodiments of the present invention, rather than all the embodiments. Based on the embodiments of the present invention, all other embodiments obtained by one of ordinary skills in the art without involving any inventive effort are within the scope of the present invention.

Figure 2:
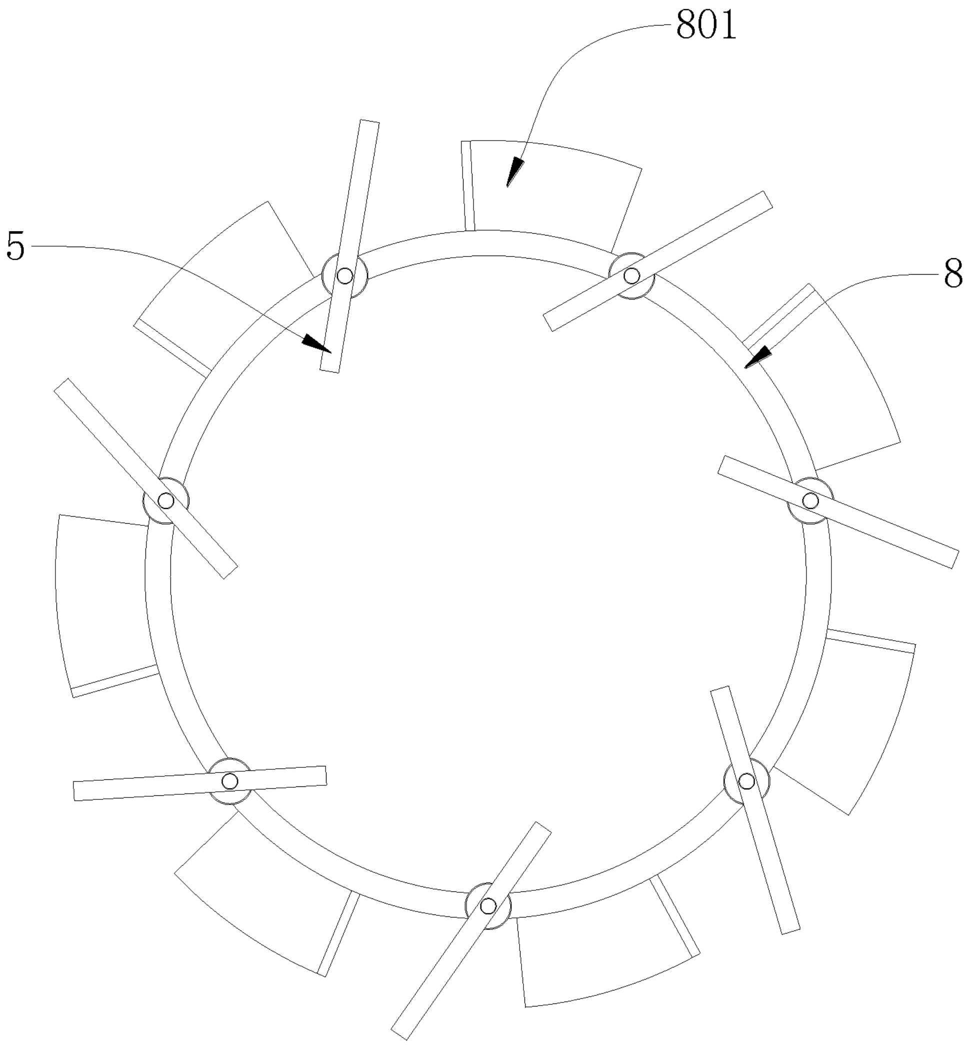
FIG. 2 is a schematic diagram of the main view of a full section structure of a push plate of the present invention.
Figure 3:
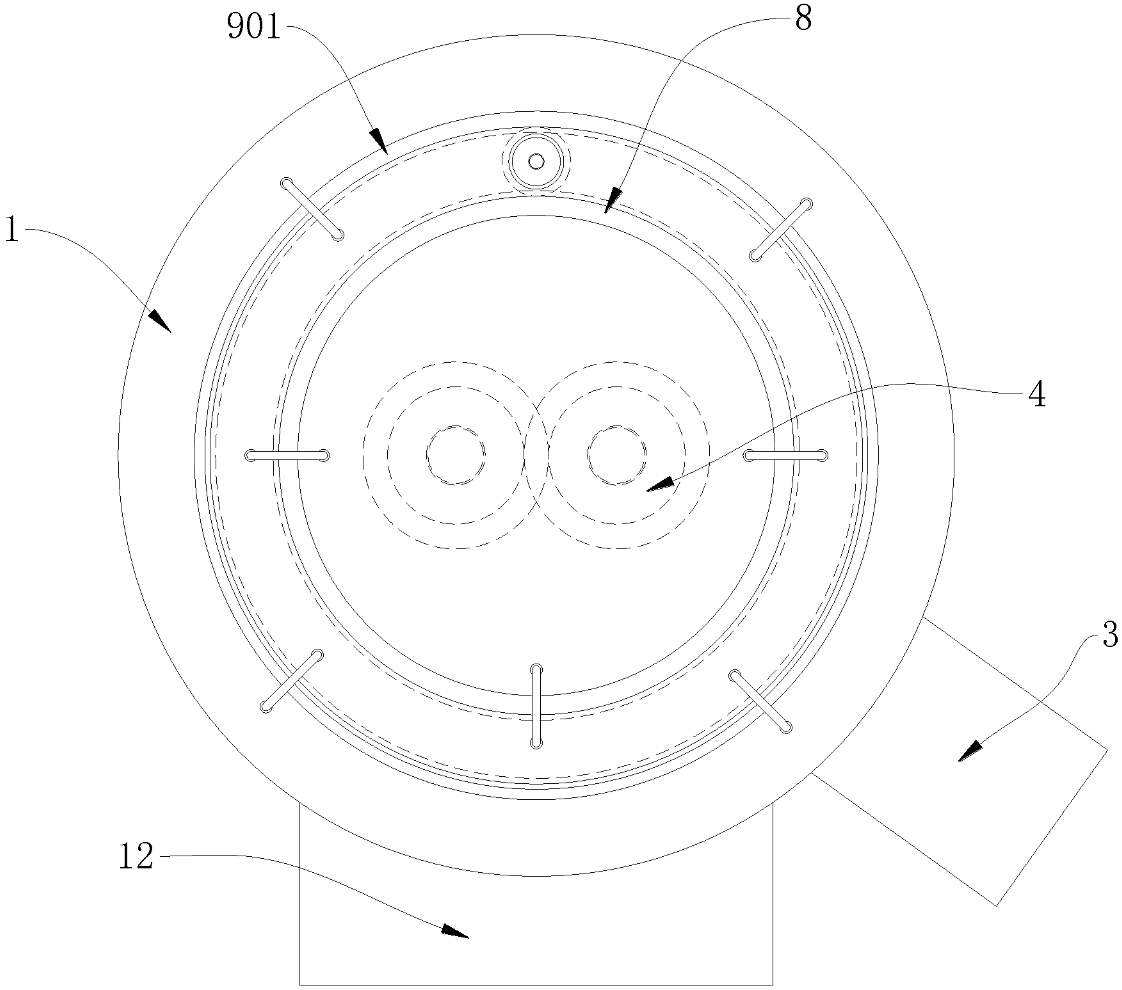
FIG. 3 is a schematic structural diagram of the rear side view of a housing of the present invention.
Figure 4:
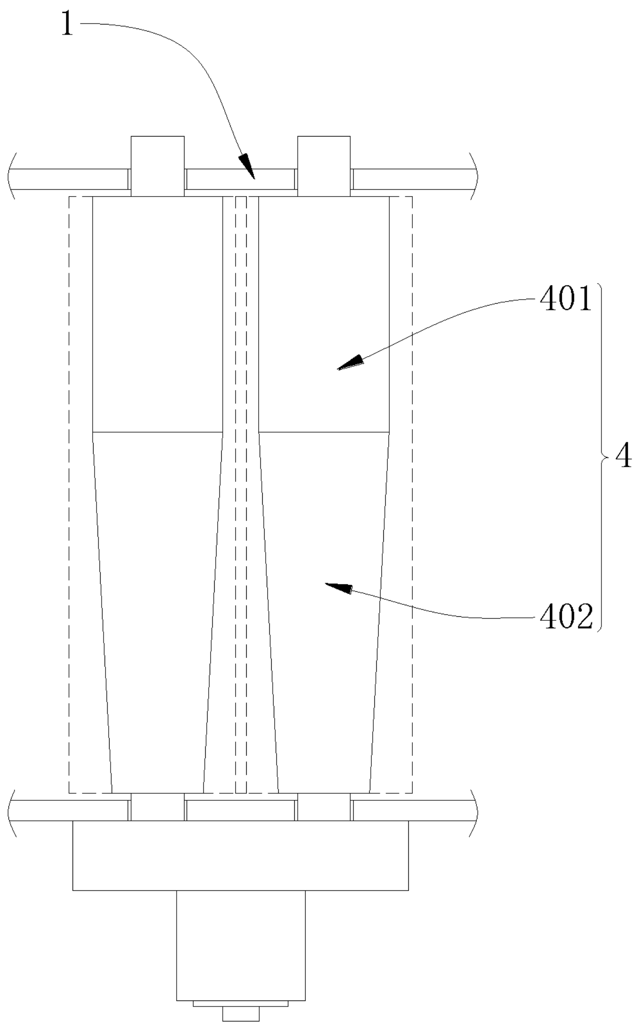
FIG. 4 is a schematic structural diagram of the top view of a crushing roller of the present invention.
Figure 5:
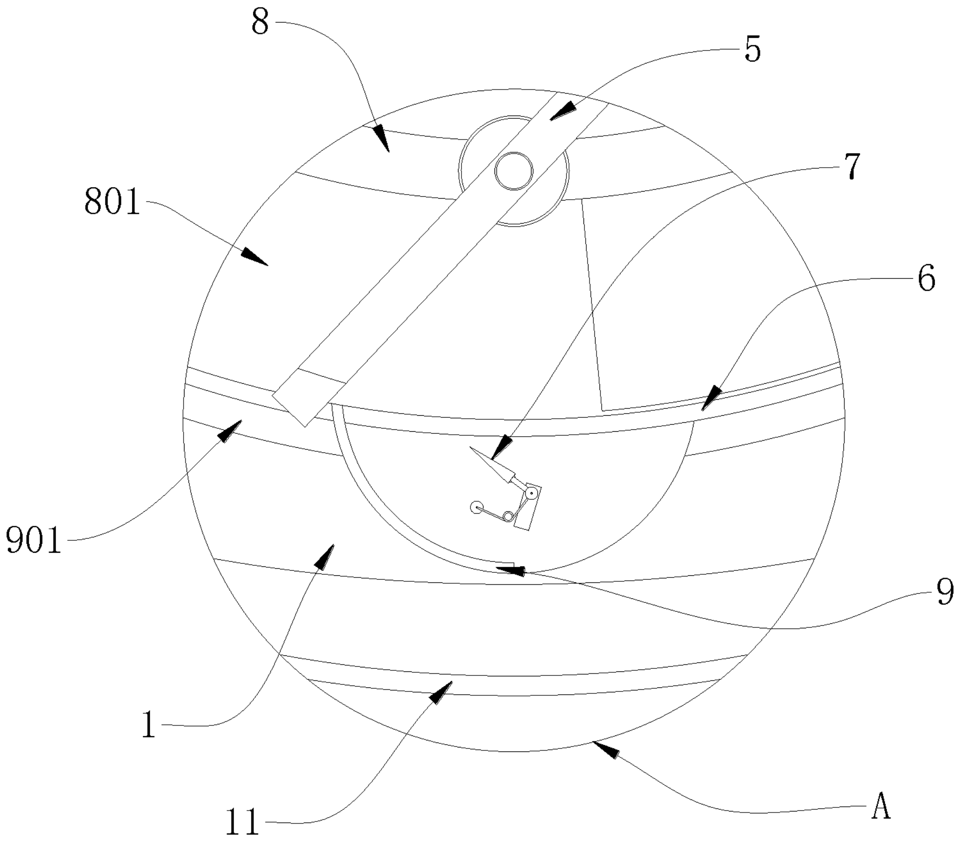
FIG. 5 is a schematic diagram of the enlarged structure at A in FIG. 1 of the present invention.
Figure 6:
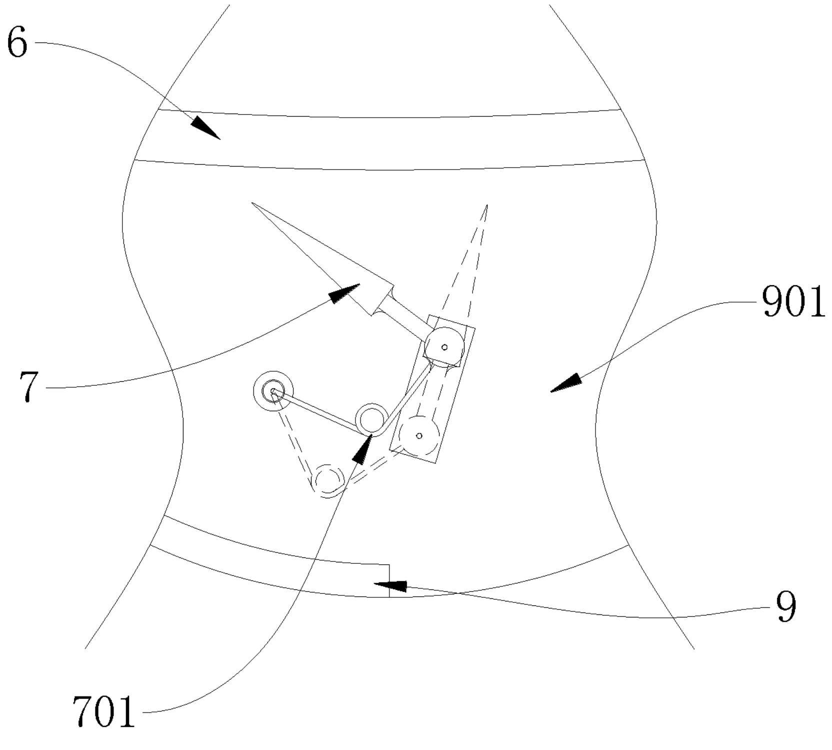
FIG. 6 is a schematic diagram of the main view and deflected structure of a slicing knife of the present invention.
Figure 7:
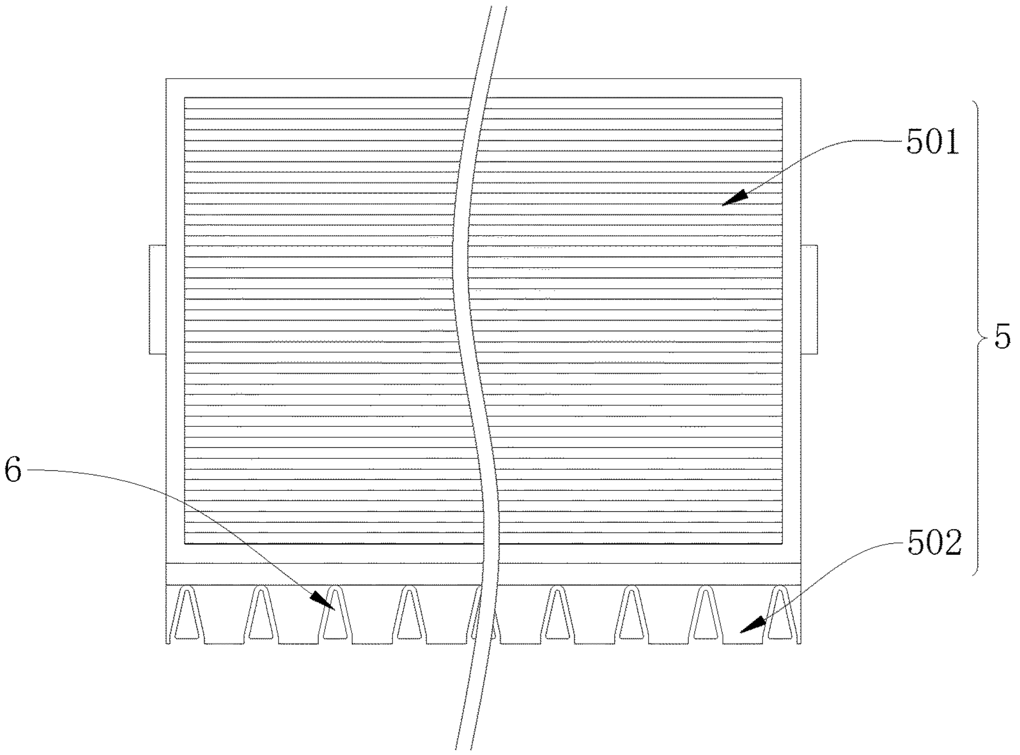
FIG. 7 is a schematic structural diagram of the left side view of an engagement state between a push plate and a comb tooth of the present invention.
Figure 8:
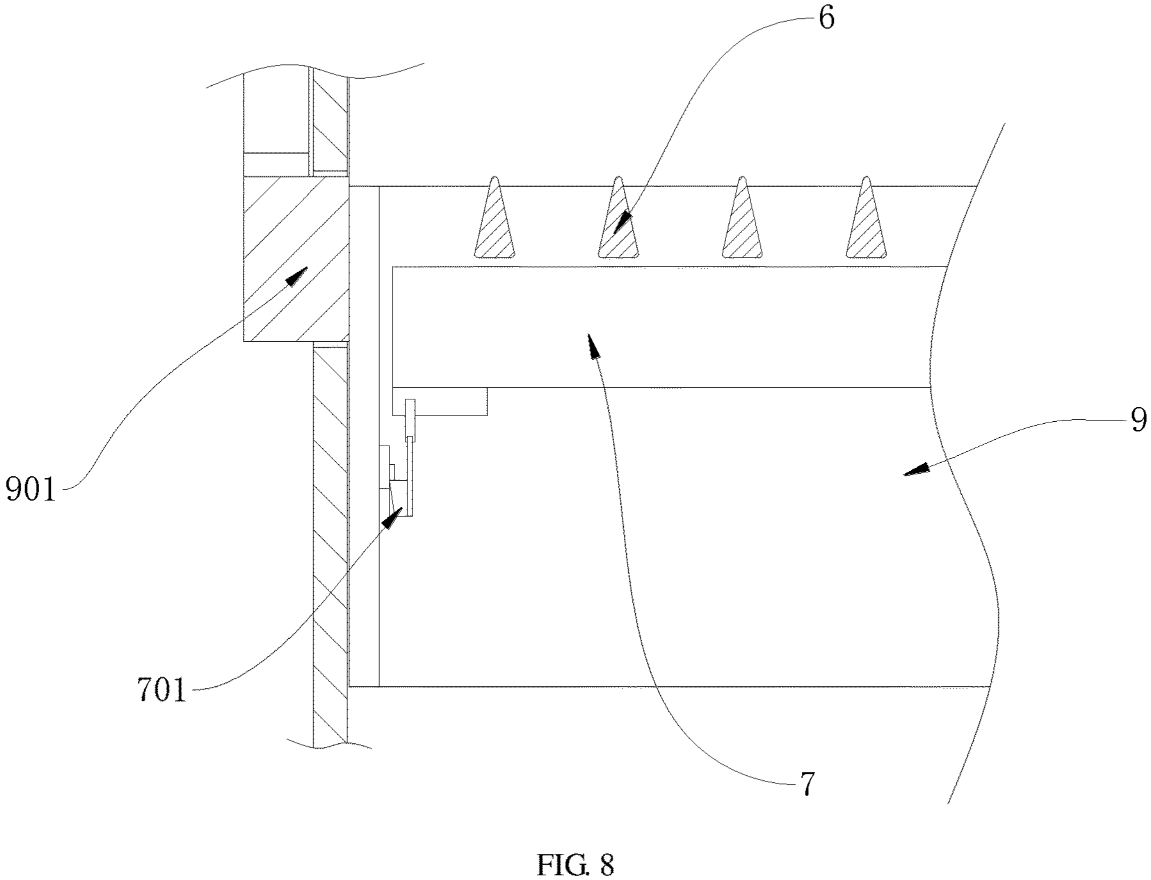
FIG. 8 is a schematic structural diagram of the left side view of a full section of a comb tooth of the present invention.

With reference to FIGS. 1 to 8, the present invention provides a technical solution: a spiral sorting device for kitchen waste based on hardness screening, including a housing 1, wherein a feed plate 2, a discharge plate 3, a gear box, and a drive motor are mounted on the outer side of the housing 1, two crushing rollers 4 are mounted inside the housing 1, the two crushing rollers 4 are connected to the drive motor via the gear box, and a gear set is provided inside the gear box;

several push plates 5 and several sawtooth rings 6 are mounted inside the housing 1, a slicing knife 7 is mounted between the sawtooth rings 6, the sawtooth ring 6 is perpendicular to the slicing knife 7, a linkage ring 8 is mounted at the front end and rear end of the slicing knife 7, a fixed plate 9 is mounted on the outer side of the sawtooth ring 6, a metal mesh 11 is mounted on the lower end of the housing 1, and a water outlet 12 is mounted on the lower end of the metal mesh 11;

the crushing roller 4 includes an action shaft 401 and a crushing tooth 402, the action shaft 401 is composed of a cylindrical shaft and a circular truncated cone shaft, one side with a small outer diameter of the circular truncated cone shaft is connected to the housing 1 at one side of the housing where a feed plate 2 is mounted, one side with a large outer diameter of the circular truncated cone shaft is connected to the cylindrical shaft, the crushing tooth 402 is cylindrical in a rotating state, and the special-shaped design of the action shaft 401 inside the crushing roller 4 performs a preliminary treatment on the high-hardness waste near the feed plate 2, so as to avoid a large working strength of the crushing roller 4 near the feed plate 2, resulting in a large difference in working strengths between the front end and rear end of the crushing roller 4; and the area where the cylindrical roller on the action shaft 401 is located performs a final treatment on the high-hardness waste so as to ensure that the crushed waste can leave through the gap of the sawtooth ring 6;

the push plate 5 is connected to the linkage ring 8 via a spring shaft, the push plate 5 is composed of a pressure plate 501 and a comb tooth 502, several steel wires are mounted inside the pressure plate 501, the steel wires are perpendicular to the sawtooth ring 6, and the outer wall of the comb tooth 502 adheres to the sawtooth ring 6;

a sawtooth is provided on one side of the sawtooth ring 6 close to the comb tooth 502, the structure of the outer surface of the sawtooth is consistent with the structure of the outer surface of the comb tooth 502, the length value of the comb tooth 502 is greater than the width of the sawtooth ring 6, and the structure of the push plate 5 itself is such provided that the push plate 5 reduces the adhesion strength between the kitchen waste and the push plate 5 during pushing the kitchen waste; at the same time, the gap of the sawtooth ring 6 is cleaned by the comb tooth 502, and the push plate 5 cooperates with the sawtooth ring 6 to treat the waste with low hardness in the kitchen waste so as to increase the proportion of the waste with high hardness in the kitchen waste; and finally, in cooperation with the crushing roller 4, the high-hardness waste is centrally treated;

an inner tooth ring 901 is mounted at the front end and the rear end of the fixed plate 9, a tooth groove is provided on both the inner wall of the inner tooth ring 901 and the outer side of the linkage ring 8, the inner tooth ring 901 and the linkage ring 8 are connected via a gear, and a drive motor is mounted on one side of the gear;

a conveying plate 801 is mounted between the linkage rings 8, the conveying plate 801 is in a helicoid shape, several notches are arranged between the conveying plates 801, a push plate 5 is arranged in the middle of the notch, an outer wall of the conveying plate 801 is fitted with the sawtooth ring 6, and the sawtooth on the inner wall of the sawtooth ring 6 is arranged to accelerate the separation of low hardness waste and crush rapidly, so as to avoid the overstock of wastes inside the housing 1 due to continuous addition, and ensure that the volume of the waste required to be processed inside the housing 1 is within a dynamic range; the sawtooth ring 6 cooperates with the fixed plate 9 and the inner tooth ring 901 to achieve the rotation of the sawtooth ring 6 inside the housing 1, thereby achieving the scenario that each region on the sawtooth ring 6 can be in contact with the waste, so as to ensure that each region on the sawtooth ring 6 has the same working strength in the processing cycle, and at the same time, the waste leaving the housing 1 is extruded, so as to achieve a preliminary dewatering effect;

a torsion spring 701 is mounted on one side of the slicing knife 7, one side of the torsion spring 701 is connected to the inner tooth ring 901, a sliding groove is provided on the inner tooth ring 901, and the slicing knife 7 is slidably connected to the inner tooth ring 901 via the sliding groove; and the fixed plate 9 has an arc shape, two ends of the fixed plate 9 have a semi-circular shape, the slicing knife 7 is stored in the sawtooth ring 6, and the gap between the fixed plate 9 and the housing 1 is smaller than the gap between the sawtooth ring 6 and the housing 1.

The operating principles of the present invention are as follows: a drive motor at the front end of the housing 1 is started; the drive motor drives the crushing roller 4 to rotate via a gear set inside the gear box, and the two crushing rollers 4 rotate towards each other; a drive motor is provided at the rear end of the housing 1; the drive motor drives the push plate 5 to work via the gear, so that the push plate 5 performs circular movement inside the housing 1; kitchen waste required to be processed enters the interior of the housing 1 via the feed plate 2; the push plate 5 moves the kitchen waste above the interior of the sawtooth ring 6, so that the kitchen waste rises along the inner wall of the sawtooth ring 6; the push plate 5 is arranged between the linkage rings 8 in an inclined manner; when the push plate 5 rises to a certain height, the height of one side of the push plate 5 close to the crushing roller 4 is lower than the height of one side of the push plate 5 close to the sawtooth ring 6, the kitchen waste on the push plate 5 will slide along the outer wall of the push plate 5 into the recess between the crushing rollers 4, the crushing roller 4 breaks the kitchen waste, and finally the broken kitchen waste falls to the lower part of the interior of the housing 1 through the gap of the sawtooth ring 6;

the special-shaped structure of the crushing roller 4 is arranged such that the crushing effect of one side of the crushing roller 4 close to the feed plate 2 is lower than the crushing effect of one side of the crushing roller 4 away from the feed plate 2; and since the gap between the circular truncated cone shafts is greater than the gap between the cylindrical shafts, the circular truncated cone shaft cooperates with the outer-side crushing tooth 402 to preliminarily crush the kitchen waste, the crushing tooth 402 on the outer side of the circular truncated cone shaft crushes the high-hardness waste inside the kitchen waste, and the crushing tooth 402 on the outer side of the cylindrical shaft further crushes the high-hardness waste inside the kitchen waste, so that the crushed waste can pass through the gap of the sawtooth ring 6;

the push plate 5 is arranged between the linkage rings 8 in an inclined manner; at the same time, the radius of rotation of the push plate 5 on one side of the spring shaft close to the crushing roller 4 is equal to the linear distance between the crushing roller 4 and the spring shaft; the push plate 5 is arranged in an inclined manner relative to the linkage ring 8; an acute-angle accommodating groove is formed between the push plate 5 and the sawtooth ring 6; during the operation of the push plate 5, the waste inside the acute-angle accommodating groove slides along the inner wall of the sawtooth ring 6; the torsional force of the spring shaft is greater than the resistance force of the waste moving on the sawtooth ring 6; therefore, the spring shaft provides a pressure for the waste toward the sawtooth ring 6 via the push plate 5 in a reverse direction; and during the movement of the waste relative to the sawtooth ring 6 pushed by the push plate 5, the waste is preliminarily cut, and the elongated waste is segmented; and with the cooperation of the push plate 5, the high-hardness waste that cannot be cut by the sawtooth ring 6 is then guided along the inclined surface of the push plate 5 into the groove of the crushing roller 4, so that the crushing roller 4 can crush the high-hardness waste;

the structural arrangement of the pressure plate 501 is as follows: by providing a fine steel wire strip on the push plate 5, the adhesion area of the waste on the push plate 5 is greatly reduced without reducing the pressing effect, so as to avoid the phenomenon that the waste cannot be separated from the push plate 5 under the action of gravity during the operation of the push plate 5; the steel wire is a metal wire with a small diameter, the pressure formed on the spring shaft directly acts on the waste through the steel wire, the spring shaft cooperates with the steel wire to form a high intensity of pressure on the surface of the waste, and part of the waste with low hardness is preliminarily crushed, so as to increase the proportion of the waste with a high hardness inside the accommodating groove; and the steel wire is perpendicular to the sawtooth ring 6, and the steel wire and the sawtooth ring 6 cooperate with each other to improve the cutting effect on the waste;

the sawtooth is arranged such that it further improves the cutting effect on the waste; during the sliding of the push plate 5 along the outer wall of the sawtooth ring 6, the recesses between the comb teeth 502 clean the outer wall of the sawtooth ring 6, so as to avoid the scenario that the waste adheres to the surface of the sawtooth ring 6 for a long time, which would otherwise result in the occurrence of corrosion on the outer wall of the sawtooth ring 6; and at the same time, the length value of the comb tooth 502 is greater than the width of the sawtooth ring 6, so as to penetrate through the gap between the sawtooth ring 6, thereby enabling the waste to avoid being caught in the gap between the sawtooth rings 6 which would otherwise affect the effect of the sawtooth ring 6 separating small-particle waste;

drive motors are mounted on two sides of the housing 1; the drive motor on the front side of the housing 1 is used for driving the crushing roller 4; the crushing rollers 4 on the rear side of the housing 1 rotate towards each other between the inner tooth ring 901 and the linkage ring 8 via a gear; the inner tooth ring 901 and the linkage ring 8 are both rotatably connected to the housing 1; the inner tooth ring 901 is connected to the sawtooth ring 6; the linkage ring 8 is connected to the push plate 5, and then the sawtooth ring 6 and the push plate 5 rotate relative to each other, so that the push plate 5 further increases the length of action of the sawtooth ring 6 on the pushed waste within one cycle of pushing the waste; the inner tooth ring 901 and the linkage ring 8 penetrate through the rear side of the housing 1, an annular shell exists between the inner tooth ring 901 and the linkage ring 8, the annular shell is connected to the housing 1 via a bracket, the drive motor is mounted on the annular shell, and the inner tooth ring 901 and the linkage ring 8 protruding on the outer side of the housing 1 are driven via a gear;

the conveying plate 801 is mounted on the outer side of the linkage ring 8, and under the drive of the drive motor, the conveying plate 801 rotates inside the sawtooth ring 6 under the transmission of the linkage ring 8, the waste enters a cylindrical cavity in the sawtooth ring 6 inside the housing 1 through the feed plate 2, and the conveying plate 801 in a working state transfers the waste entering the cavity to the depth of the housing 1, so as to ensure that the waste is uniformly spread on the sawtooth ring 6; and at the same time, the waste inside the sawtooth ring 6 is disturbed, so that the sawtooth ring 6 screening the small-particle waste is accelerated, so as to reduce the processing strength of the sawtooth ring 6;

several notches are provided on the conveying plate 801, so that the push plate 5 penetrates through the conveying plate 801, and the space limited by the notches is the movement space of the push plate 5, so as to limit the deflection angle of the push plate 5;

when the material moves inside the acute-angle accommodating groove, part of the waste is under the pressure formed by the spring shaft and the push plate 5, the waste extends into the gap of the sawtooth ring 6, and the arrangement of the slicing knife 7 cuts the waste extending into the gap of the sawtooth ring 6; and since the slicing knife 7 and the sawtooth ring 6 are arranged perpendicularly to each other, the crushing effect of the waste is further improved;

a certain amount of high-hardness waste exists in the waste, and the slicing knife 7 cannot form a cutting effect on the high-hardness waste; when the high-hardness waste comes into contact with the slicing knife 7, the torsion spring 701 and the inner ring magnetic ring 901 are connected via a second spring shaft; the high-hardness waste pushes the slicing knife 7 to deflect with the second spring shaft as the center of the circle; at the same time, the included angle formed between the action rods at two ends of the torsion spring 701 decreases, and the distance between the deflected slicing knife 7 and the sawtooth increases until the high-hardness waste completely passes over the slicing knife 7; by the arrangement of the second spring shaft and the torsion spring 701, protection is provided for the slicing knife 7, the sliding groove provides a limiting effect for the slicing knife 7, the slicing knife 7 is arranged obliquely in a normal state, and the included angle formed between the movement direction of the waste and the slicing knife 7 is an acute angle; and when the torsion spring 701 is twisted to the maximum limit, the included angle formed between the slicing knife 7 and the movement direction of the high-hardness waste is an obtuse angle;

two ends of the fixed plate 9 are connected to the inner tooth ring 901, the drive motor works to drive the inner tooth ring 901 to rotate, and at the same time, the fixed plate 9 rotates in the housing 1; since the gap between the fixed plate 9 and the housing 1 is smaller than the gap between the sawtooth ring 6 and the housing 1, and at the same time, the fixed plate 9 is arranged in an arc-shaped plate shape, when the fixed plate 9 passes through the region where the metal mesh 11 is located, the fixed plate 9 presses the waste crushed at the lower part of the interior of the housing 1, the liquid in the waste is extruded and leaves through the metal mesh 11, then the fixed plate 9 pushes the extruded waste into the region where the discharge plate 3 is located, and the waste finally leaves the housing 1 through the discharge plate 3; and since the sawtooth rings 6 are connected via the fixed plate 9, when the comb tooth 502 slides on the sawtooth rings 6 to the region where the fixed plate 9 is located, due to the obstruction of the fixed plate 9, the push plate 5 is forced to deflect with the spring shaft as the center of the circle until the push plate 5 passes over the region where the fixed plate 9 is located, the push plate 5 is quickly reset under the action of the spring shaft until the push plate 5 meets the sawtooth ring 6, and the speed change effect of the push plate 5 during the reset causes the waste adhered on the surface of the push plate 5 to separate under the action of inertia.

It needs to be noted that the relational terms such as the first and the second, and the like herein are merely intended to distinguish one entity or operation from another entity or operation without necessarily requiring or implying any actual such relationship or order between such entities or operations. Furthermore, the terms “comprises”, “comprising”, or any other variation thereof, are intended to cover a non-exclusive inclusion, such that a process, a method, an article, or equipment that comprises a list of elements not only includes those elements but also includes other elements not expressly listed or elements inherent to such process, method, article, or equipment.

Finally, it should be noted that the above is only the preferred embodiment of the present invention and is not intended to limit the present invention. Although the present invention has been described in detail with reference to the above embodiments, those skilled in the art can still modify the technical solutions recorded in the above embodiments or replace some of the technical features equally. Any modification, equivalent replacement, improvement, etc. made within the spirit and principle of the present invention shall be included in the protection scope of the present invention.

The invention claimed is:

1. A spiral sorting device for kitchen waste based on hardness screening, comprising a housing (1), characterized in that: a feed plate (2), a discharge plate (3), a gear box, and a drive motor are mounted on an outer side of the housing (1), two crushing rollers (4) are mounted inside the housing (1), the two crushing rollers (4) are connected to the drive motor via the gear box, and a gear set is provided inside the gear box; and several push plates (5) and several sawtooth rings (6) are mounted inside the housing (1), a slicing knife (7) is mounted between the sawtooth rings (6), the sawtooth ring (6) is perpendicular to the slicing knife (7), a linkage ring (8) is mounted on a front end and rear end of the slicing knife (7), a fixed plate (9) is mounted on an outer side of the sawtooth ring (6), a metal mesh (11) is mounted on a lower end of the housing (1), and a water outlet (12) is mounted on a lower end of the metal mesh (11).

2. The spiral sorting device for kitchen waste based on hardness screening according to claim 1, characterized in that: the crushing roller (4) comprises an action shaft (401) and a crushing tooth (402), wherein the action shaft (401) is composed of a cylindrical shaft and a circular truncated cone shaft, one side with a small outer diameter of the circular truncated cone shaft is connected to the housing (1) on one side where the feed plate (2) is mounted, one side with a large outer diameter of the circular truncated cone shaft is connected to the cylindrical shaft, and the crushing tooth (402) is cylindrical in a rotating state.

3. The spiral sorting device for kitchen waste based on hardness screening according to claim 1, characterized in that: the push plate (5) is connected to the linkage ring (8) via a spring shaft, and the push plate (5) is composed of a pressure plate (501) and a comb tooth (502), wherein several steel wires are mounted inside the pressure plate (501), the steel wire is perpendicular to the sawtooth ring (6), and an outer wall of the comb tooth (502) is fitted with the sawtooth ring (6).

4. The spiral sorting device for kitchen waste based on hardness screening according to claim 3, characterized in that: one side of the sawtooth ring (6) close to the comb tooth (502) is provided with a sawtooth, an outer surface structure of the sawtooth conforms to an outer surface structure of the comb tooth (502), and a length value of the comb tooth (502) is greater than a width of the sawtooth ring (6).

5. The spiral sorting device for kitchen waste based on hardness screening according to claim 1, characterized in that: inner tooth rings (901) are mounted on a front end and rear end of the fixed plate (9), tooth grooves are provided on both an inner wall of the inner tooth ring (901) and an outer side of the linkage ring (8), the inner tooth ring (901) and the linkage ring (8) are connected via a gear, and a drive motor is mounted on one side of the gear.

6. The spiral sorting device for kitchen waste based on hardness screening according to claim 5, characterized in that: a conveying plate (801) is mounted between the linkage rings (8), the conveying plate (801) is in a helicoid shape, several notches are provided between the conveying plates (801), the push plate (5) is provided in a middle of the notch, and an outer wall of the conveying plate (801) is fitted with the sawtooth ring (6).

7. The spiral sorting device for kitchen waste based on hardness screening according to claim 6, characterized in that: a torsion spring (701) is mounted on one side of the slicing knife (7), one side of the torsion spring (701) is connected to the inner tooth ring (901), a sliding groove is provided on the inner tooth ring (901), and the slicing knife (7) is slidably connected to the inner tooth ring (901) via the sliding groove.

8. The spiral sorting device for kitchen waste based on hardness screening according to claim 7, characterized in that: the fixed plate (9) has an arc shape, two ends of the fixed plate (9) have a semi-circular shape, the slicing knife (7) is stored in the sawtooth ring (6), and a gap between the fixed plate (9) and the housing (1) is smaller than a gap between the sawtooth ring (6) and the housing (1).

* * * * *